United States Patent
Cooper

(10) Patent No.: US 9,411,144 B2
(45) Date of Patent: Aug. 9, 2016

(54) SYSTEMS FOR FLUORESCENCE ILLUMINATION USING SUPERIMPOSED POLARIZATION STATES

(75) Inventor: Jeremy R. Cooper, Issaquah, WA (US)

(73) Assignee: GE HEALTHCARE BIO-SCIENCES CORP., Piscataway, NJ (US)

( * ) Notice: Subject to any disclaimer, the term of this patent is extended or adjusted under 35 U.S.C. 154(b) by 0 days.

(21) Appl. No.: 13/348,750

(22) Filed: Jan. 12, 2012

(65) Prior Publication Data

US 2012/0176673 A1 Jul. 12, 2012

Related U.S. Application Data

(60) Provisional application No. 61/432,008, filed on Jan. 12, 2011.

(51) Int. Cl.
*G02B 21/16* (2006.01)
*G02B 21/00* (2006.01)
*G02B 27/28* (2006.01)

(52) U.S. Cl.
CPC ............ *G02B 21/16* (2013.01); *G02B 21/0092* (2013.01); *G02B 27/283* (2013.01)

(58) Field of Classification Search
CPC ............. G02B 21/0032; G02B 21/006; G02B 21/0068; G02B 21/0076; G02B 21/0092; G02B 21/06; G02B 21/16; G02B 21/18

USPC ......... 359/368, 371, 385, 386, 387, 388, 389, 359/390, 433, 434, 435; 356/364, 365, 366, 356/367, 368, 369, 370; 250/225
See application file for complete search history.

(56) References Cited

U.S. PATENT DOCUMENTS

| | | | | |
|---|---|---|---|---|
| 6,075,643 A * | 6/2000 | Nonoda | ............. | G02B 21/0088 359/372 |
| 6,804,003 B1 * | 10/2004 | Wang et al. | .................... | 356/369 |
| 2004/0001253 A1 * | 1/2004 | Abe et al. | ........................ | 359/388 |
| 2006/0250690 A1 * | 11/2006 | Ulrich et al. | .................. | 359/385 |
| 2009/0121153 A1 * | 5/2009 | Baer | .................. | G01N 21/6428 250/458.1 |
| 2011/0109958 A1 * | 5/2011 | Yokoi | ............................ | 359/363 |

* cited by examiner

*Primary Examiner* — Thomas K Pham
*Assistant Examiner* — Cara Rakowski
(74) *Attorney, Agent, or Firm* — Sutherland Asbill & Brennan LLP

(57) ABSTRACT

Various superimposing beam controls that can superimpose beams of light with different optical properties are described. In one aspect, a beam control receives a beam of light and outputs one or more beams. Each beam is output in a different polarization state and with different optical properties. Superimposing beam controls can be incorporated in fluorescence microscopy instruments to split a beam of excitation light into one or more beams of excitation light. Each beam of excitation light has a different polarization and is output with different optical properties so that each excitation beam can be used to execute a different microscopy technique.

20 Claims, 11 Drawing Sheets

SYSTEMS FOR FLUORESCENCE ILLUMINATION USING SUPERIMPOSED POLARIZATION STATES

CROSS-REFERENCE TO RELATED APPLICATIONS

This application claims the benefit of U.S. provisional application No. 61/432,008; filed Jan. 12, 2011.

TECHNICAL FIELD

This disclosure relates to fluorescence microscopy and, in particular, to fluorescent microscopy instruments that can use different microscopy techniques to image a specimen.

BACKGROUND OF THE INVENTION

Fluorescence microscopy offers a unique approach to the study of living and fixed cells because of its sensitivity, specificity and versatility. Fluorescent light emitted from fluorescent probes attached to components of a specimen can be simultaneously detected as image and photometric data using the microscope, which provides the potential for qualitative and quantitative studies on the structure and function of the components. In recent years, increasingly elaborate fluorescence microscopy techniques, including fluorescence recovery after photobleaching ("FRAP"), fluorescence lifetime imaging microscopy ("FLIM"), fluorescence resonance energy transfer ("FRET"), fluorescence loss in photobleaching ("FLIP") and total internal reflection fluorescence ("TIRF") microscopy, just to name a few, have been developed to enable visualization and analysis of ever more complex events in cells, organelles and sub-organelle components within biological specimens. However, implementing these different microscopy techniques in the same fluorescence microscope involves focusing the excitation beam at different rear focal axial positions of the microscope objective lens and/or directing the excitation beams along a particular path through the microscope objective lens. One approach to addressing this issue has been to use fast rotatable mirrors to rapidly steer the beam when switching from one technique to another. However, steering the excitation beam in this manner limits use of the microscope to only one fluorescence microscopy technique at a time because the mirror can only be used to select one optical path at a time. For the above described reasons, engineers, scientists, and fluorescent microscope manufacturers continue to seek fast, efficient, and cost effective systems that enable a fluorescence microscope to simultaneously use different fluorescence microscopy techniques.

SUMMARY OF THE INVENTION

Various superimposing beam controls that can superimpose beams of light with different optical properties are described. In one aspect, a beam control receives a beam of light and outputs one or more beams. Each beam is output with a different polarization state and with different optical properties. Superimposing beam controls can be incorporated in fluorescence microscopy instruments to split a beam of excitation light into one or more beams of excitation light. Each beam of excitation light has a different polarization and is output with different optical properties so that each excitation beam can be used to execute a different microscopy technique.

DETAILED DESCRIPTION OF THE INVENTION

Figure 1:
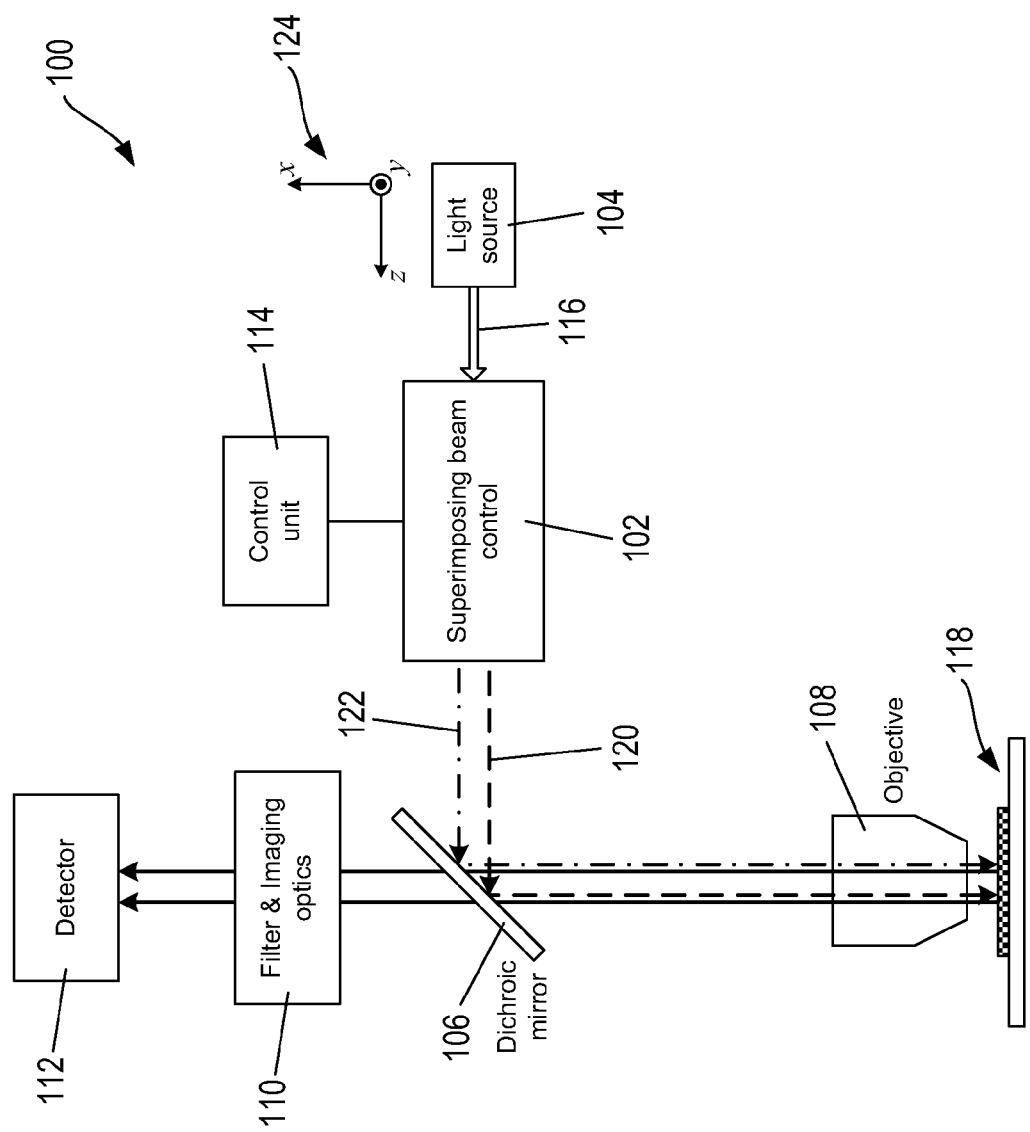
FIG. 1 shows an example of a fluorescence microscopy instrument that includes a superimposing beam control.

FIG. 1 shows an example of a fluorescence microscopy instrument 100 that includes a superimposing beam control 102. The instrument 100 also includes a light source 104, a dichroic minor 106, an objective lens 108, filtering and imaging optics 110, a detector 112, and a control unit 114 connected to the beam control 102. The light source 104 can be a laser that emits a high-intensity, substantially monochromatic beam of excitation light 116 selected to stimulate emission of fluorescent light from fluorophores of fluorescent probes that are designed to bind to particular components of a specimen 118. The beam 116 can be linearly polarized with a particular polarization angle and is input to the beam control 102, which splits the excitation beam 116 into a first beam with a first polarization state represented by dashed line directional arrow 120 and a second beam with a second polarization state represented by dot-dashed line directional arrow 122. The dichroic minor 106 is configured and positioned to reflect the excitation wavelength of the light output from the source 104. As a result, the beams 120 and 122 are reflected into the objective lens 108. The beam control 102 outputs the beams 120 and 122 with different optical properties so that each beam illuminates the specimen 118 in accordance with a different microscopy technique. The control unit 114 can be used to select the intensity associate with each beam and/or selectively turn "off" one of the differently polarized beams 120 and 122. A portion of the fluorescent light emitted from the fluorophores is captured and collimated by the objective lens 108. In the example of FIG. 1, the dichroic minor 106 is configured to transmit the fluorescent light wavelengths. The filter and imaging optics 110 block passage of the excitation wavelength and focuses the fluorescent light onto the detector 112. The detector 112 can be a CMOS camera, a CCD camera, or a photodetector.

Figure 2:
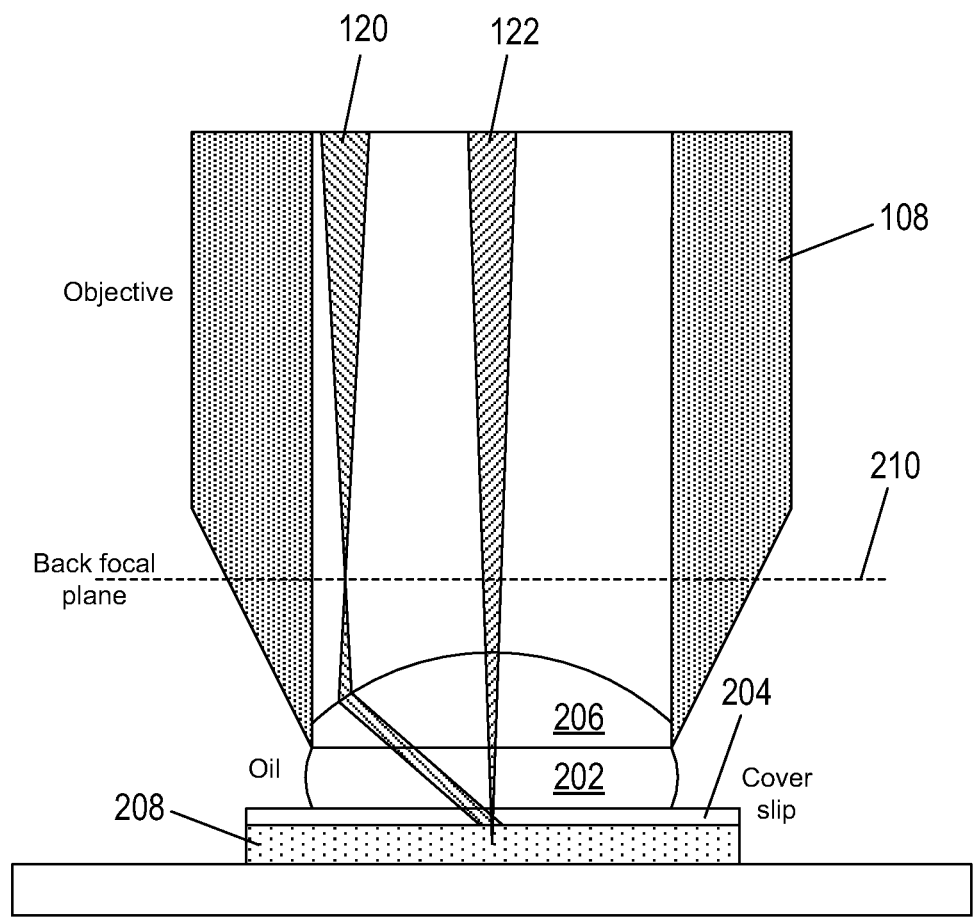
FIG. 2 shows a cross-sectional view of an objective lens with two differently polarization excitation beams to execute two different microscopy techniques.

FIG. 2 shows an xz-plane cross-sectional view of the objective lens 108 and represents an example of using the two differently polarization excitation beams 120 and 122 to execute two different microscopy techniques. In the example of FIG. 2, the objective lens 108 is an oil immersion objective with immersion oil 202 disposed between a coverslip 204 and a convex-plano lens 206 of the objective lens 108. The beam 120 is used to perform total internal reflection ("TIRF")

microscopy, while the beam 122 is used to perform a different microscopy technique, such as fluorescence recovery after photobleaching ("FRAP"). In order to perform TIRF microscopy, the objective lens 108 has a high numerical aperture ("NA") and the beam 120 is input to the objective lens 108 to travel along the outer edges of the internal lenses of the objective 108 so that the excitation light can be directed into the coverslip 204 with an angle of incidence that supports total internal reflection at the coverslip 204/specimen 208 interface. The coverslip 204 and oil 202 have nearly the same refractive index of approximately 1.52, and the specimen 208 can be in an aqueous medium with a refractive index of approximately 1.35, which supports total internal reflection within the coverslip 204. The NA of the objective lens 108 is higher than the refractive index of the specimen (e.g., NA>1.35 for aqueous mounts). With TIRF microscopy, the beam control 102 outputs the beam 120 so that the beam 120 is focused near a back focal plane 210 of the objective lens 108 and forms a substantially collimated beam of excitation light that strikes the interface with an angle of incidence that is larger than a critical angle with respect to the interface normal. As a result, the excitation light experiences total internal reflection which generates an electromagnetic field that penetrates beyond the interface into the specimen 208 as an evanescent wave with the excitation wavelength to excite fluorescence within a thin region (i.e., ~100 nm) of the specimen 208 near the interface. On the other hand, the beam control 102 outputs the beam 122 so that the objective lens 108 focuses the beam 122 to create a darker, photobleached region behind the region of the specimen excited by the evanescent wave created by the beam 120. The beam control 102 can be operated so that the beams 120 and 122 simultaneously illuminate the specimen 208 with different intensity or illuminate the specimen 208 at different times. For example, the beam 122 can be used to first illuminate a region of the specimen behind the interface with high-intensity for a period time followed by illuminating the interface region of the specimen 208 with the evanescent wave created by the beam 120.

Figure 3:
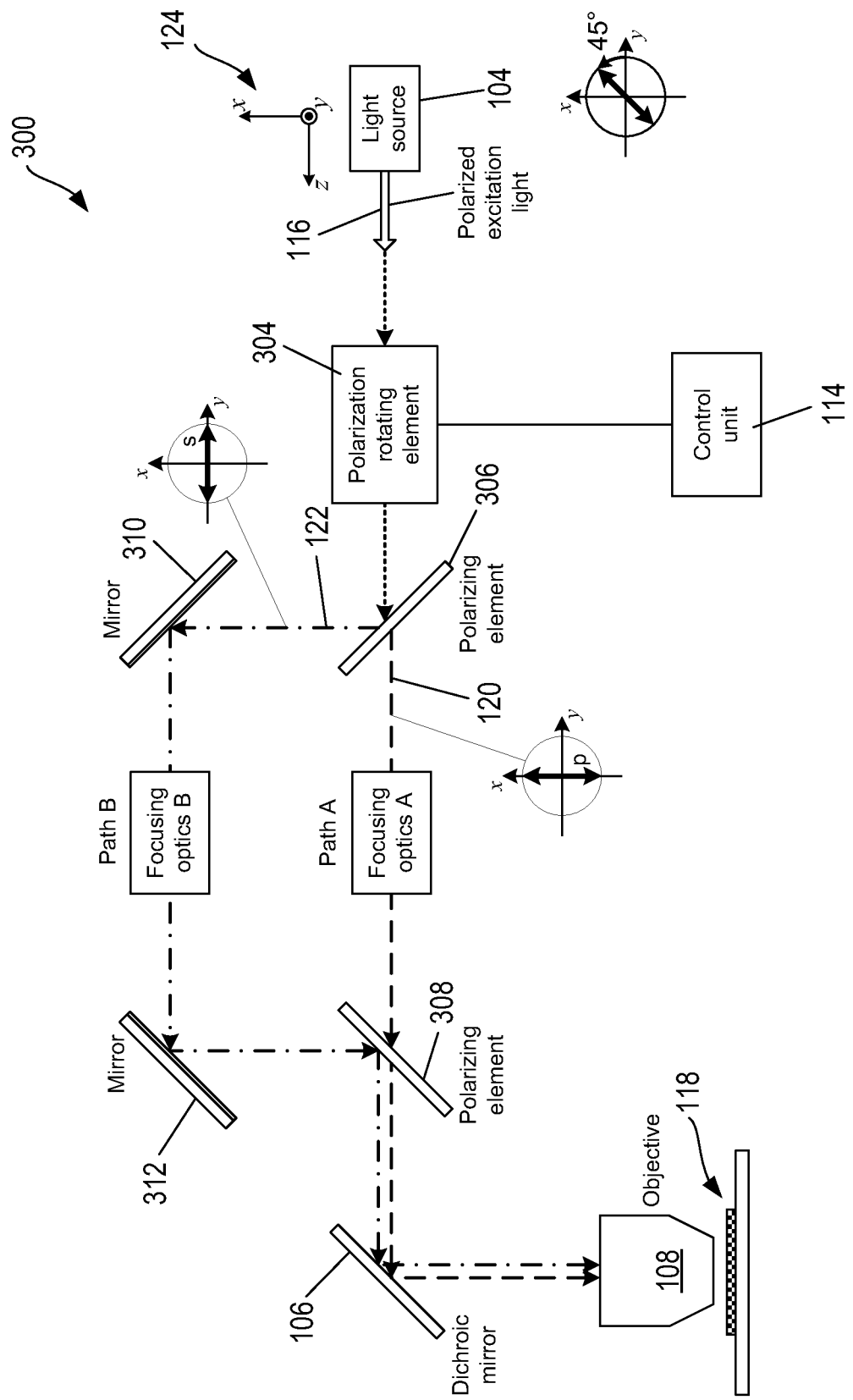
FIG. 3 shows a schematic representation of an example superimposing beam control to generate and control the optical properties of the two polarized beams.

FIG. 3 shows a schematic representation of an example superimposing beam control 300 that can be used to generate and control the optical properties of the two differently polarized beams 120 and 122. The beam control 300 includes a polarization rotating element 304, first and second polarizing elements 306 and 308, and first and second mirrors 310 and 312. In the example of FIG. 3, the light source 104 outputs the excitation light with 45° polarization angle with respect to the y-axis of a Cartesian coordinate system 124. The polarization rotating element 304 is connected to the control unit 114 and can be operated to change the linear polarization state of the excitation beam that reaches the first polarizing element 306. The polarizing elements 306 and 308 can be polarizing beamsplitters, Wollaston prisms or Nomarski prisms. The first polarizing element 306 is oriented to split the polarized excitation beam output from the polarization rotating element 304 into the beam 120 in the first polarization state and the beam 122 in the second polarization state. The beam 120 propagates along a path A and the beam 122 propagates along a different path B. The relative intensities of the beams 120 and 122 is selected by operating the polarization rotating element 304 to output light with a particular polarization. The beam 120 passes through focusing optics A prior to reaching polarizing element 308. The beam 122 is reflected off the first mirror 310 to pass through focusing optics B and is reflected off the second mirror 312 to reach polarizing element 308. The polarizing element 308 receives and directs the beams and 120 and 122 to the dichroic mirror 106, which reflects the beams 120 and 122 into the objective lens 108. The focusing optics A and B are each composed of a different combination and arrangement of optical elements, such as lenses and mirrors, so that the beams 120 and 122 are superimposed but illuminate the specimen 118 according to different microscopy techniques. For example, the focusing optics A can be composed of a combination and arrangement of optical elements that enable the beam 120 to be used for TIRF microscopy and the focusing optics B can be composed of a different combination and arrangement of optical elements that enable the beam 122 to be used for FRAP microscopy, as described above in the example of FIG. 2. In alternative embodiments, the focusing optics A and B can be composed of combinations and arrangements of optical elements that enable the beams 120 and 122 to be used to perform any suitable combination of two microscopy techniques, including, but not limited to, TIRF microscopy, FRAP microscopy, FLIP microscopy, FRET microscopy, and FLIM microscopy.

Figure 4A:
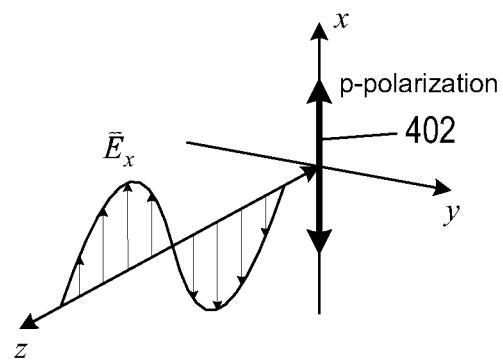
FIGS. 4A-4B show an example representation of two polarization states associated with orthogonal polarized excitation beams.
Figure 4B:
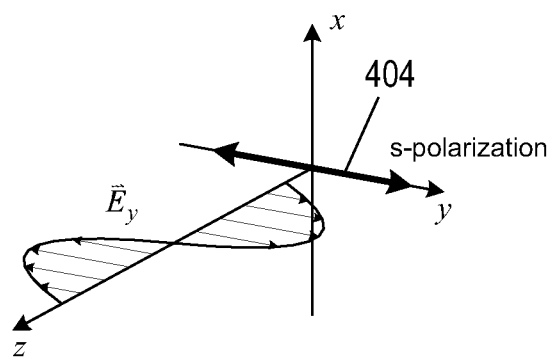

The first and second polarization states associated with the beams 120 and 122 are orthogonal polarization states that are maintained in order to superimpose the beams as the beams enter the objective lens 108 without constructive and destructive interference. The beams 120 and 122 can be output from the beam control 102 in p- and s-polarization states, which are basis states for the beam 116 and are defined as follows. FIGS. 1 and 3, and subsequent figures, include the Cartesian coordinate system 124. The terms "polarization state" or "polarization angle" refer to the angle at which the electric field component of a beam of linearly polarized light is to the y-axis of the coordinate system 124. The z-axis represents the propagation direction of the excitation beam 116 output from the light source 104 and the propagation direction of the differently polarized excitation beams 120 and 122 output from the beam control 102. As shown in FIGS. 1 and 3, the instrument 100 components and the beam control 300 components lie in the xz-plane. FIGS. 4A-4B show an example representation of two polarization states associated with orthogonal polarized beams 120 and 122 based on the same Cartesian coordinate system. In FIG. 4A, the polarization state of the beam 120 is represented with an electric field component, $\vec{E}_x$, that oscillates in the xz-plane. When the beam control 102 outputs the beam 120 with the electric field component directed parallel to the xz-plane, the beam 120 is referred to as p-polarized or as having p-polarization represented by double-headed directional arrow 402. On the other hand, the polarization state of the beam 122 represented in FIG. 4B has an electric field component, $\vec{E}_y$, that oscillates in the yz-plane. When the beam control 102 outputs the beam 122 with the electric field component directed parallel to the yz-plane, the beam 122 is referred to as s-polarized or as having s-polarization represented by double-headed directional arrow 404.

Figure 5A:
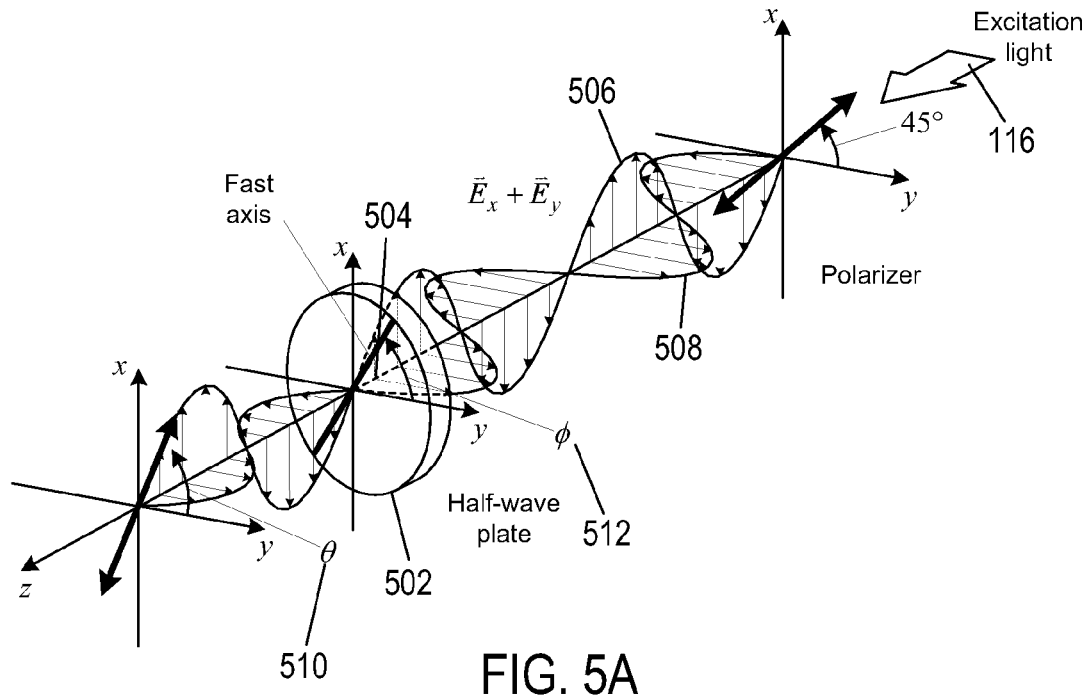
FIGS. 5A-5D show an example implementation of a polarization rotating element shown in FIG. 3 to generate and control two orthogonally polarized beams.
Figure 5B:
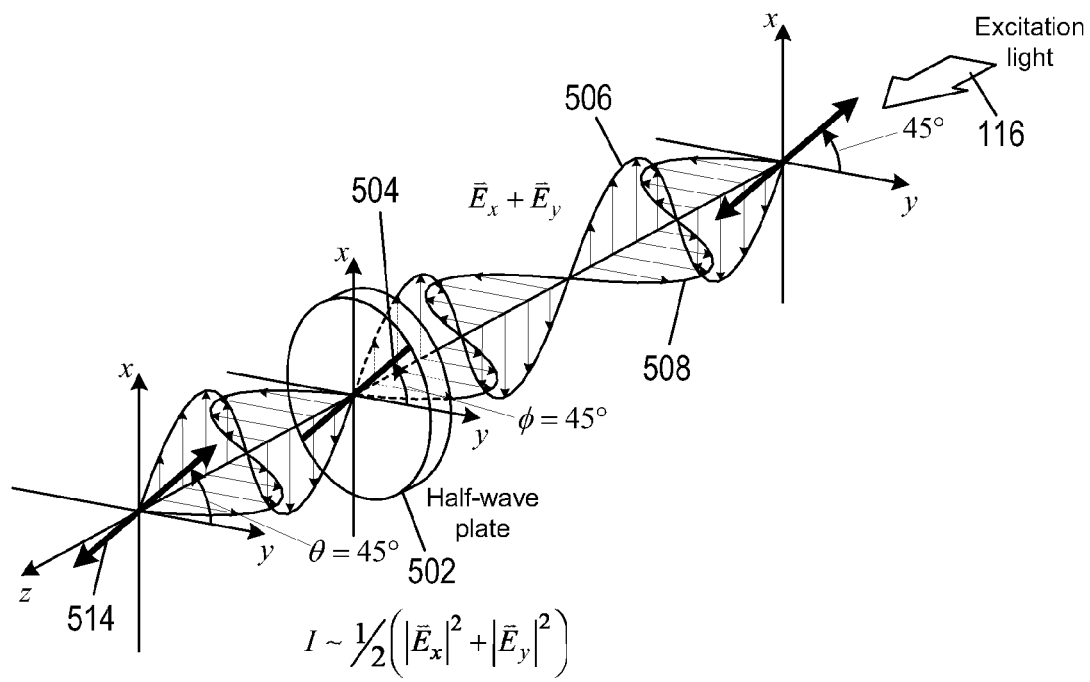
Figure 5C:
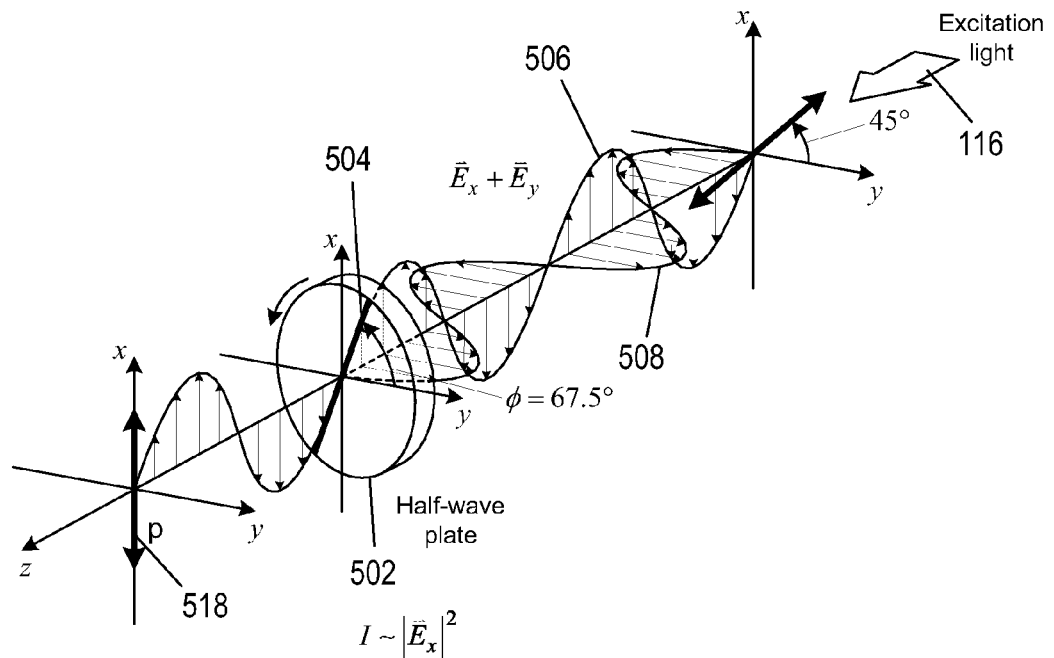
Figure 5D:
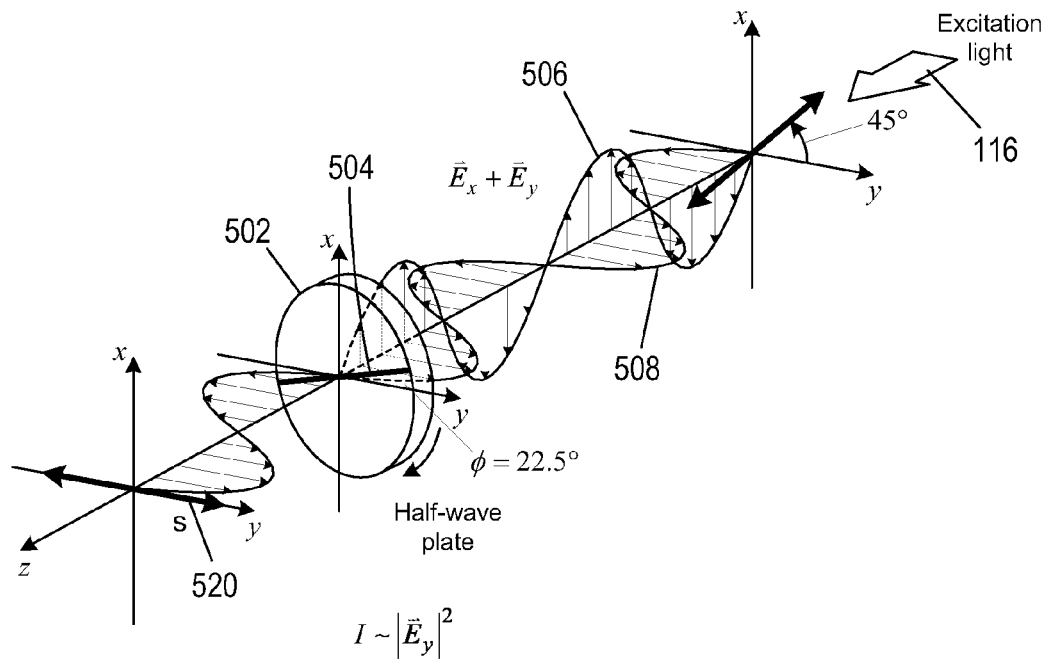

FIGS. 5A-5D show an example implementation of the polarization rotating element 304 to generate and control the orthogonally polarized beams 120 and 122. In FIGS. 5A-5D, Cartesian coordinates correspond to the Cartesian coordinates 124 used in FIGS. 1-4. The polarization rotating element 304 is implemented as a half-wave plate represented by a disk 502 that lies in the xy-plane and intersects the z- or propagation axis of the excitation light 116. The half-wave plate 502 is rotated about the z-axis within the xy-plane by a motor not shown. Dark line 504 represents the orientation of the fast axis of the half-wave plate 502. As described above with reference to FIG. 3, the excitation light can be output from the light source 104 with a 45° polarization angle with respect to the y-axis that can be decomposed into two orthogonal polarization basis states, which can be an xz-plane polarization state, $\vec{E}_x$, 506 (i.e., p-polarization state) and a yz-plane polarization state, $\vec{E}_y$, 508 (i.e., s-polarization state). In the example of FIG. 5A, the angle θ 510 associated with the polarization state of the light output from the half-wave plate 502 is determined by the angle φ 512 of the fast axis 504. By rotating the half-wave plate 502 with the angle φ of the fast axis restricted to 22.5°≤φ≤67.5°, the excitation light can be output from the half-wave plate 502 with a desired polarization angle θ between s- and p-polarization (i.e., 0 and 90° polarization). In other words, the excitation light can be output from the half-wave plate 502 with a polarization angle θ between 0 and 90° with respect to the y-axis, by rotating the fast axis 504 of the half-wave plate 502 into an angle given by φ=(θ+45°)/2. The intensity of the excitation light output from the half-wave plate 502 can be represented by:

$$I \sim (|\vec{E}_x|^2 \sin^2\theta + |\vec{E}_y|^2 \cos^2\theta)$$

where $|\vec{E}_x|^2$ and $|\vec{E}_x|^2$ represent the amplitudes of the orthogonal polarization basis states, respectively. The example of FIG. 5A represents the case where the p-polarization component has a larger contribution than the s-polarization component to the intensity of the excitation light with polarization angle θ. In other words, the polarization angle θ can be selected to control the relative intensity of the s- and p-polarization components. In the example of FIG. 5B, the fast axis 504 is at a 45° angle with respect to the y-axis in order to output the excitation light with a 45° polarization angle. In the example of FIG. 5C, the fast axis 504 is at 67.5° with respect to the y-axis in order to output the excitation light with p-polarization, as represented by directional arrow 518. In the example of FIG. 5D, the fast axis 504 is at 22.5° with respect to the y-axis in order to output the excitation light with s-polarization, as represented by directional arrow 520.

Returning to FIG. 3, FIG. 3 includes an example representation of the excitation light output with a 45° polarization angle. The polarizing element 306 is a beamsplitter oriented to split the excitation light into p- and s-polarization component beams 120 and 122, respectively. In particular, the element 306 splits the excitation light into the beam 122 with s-polarization that travels the path A and the transmit the beam 120 with p-polarization that travels the path B. The polarization rotating element 304 provides fine-tune intensity control of the two beams 120 and 122 as described above with reference to FIGS. 5A-5D. For example, when the beam 122 is used for photobleaching, and the beam 120 is used for TIRF microscopy or epi-illumination of the specimen 118 as described above with reference to FIG. 2, the polarization rotating element 304 outputs the excitation beam in a polarization state where the intensity of the beam 122 is greater than the intensity of the beam 120.

Figure 6:
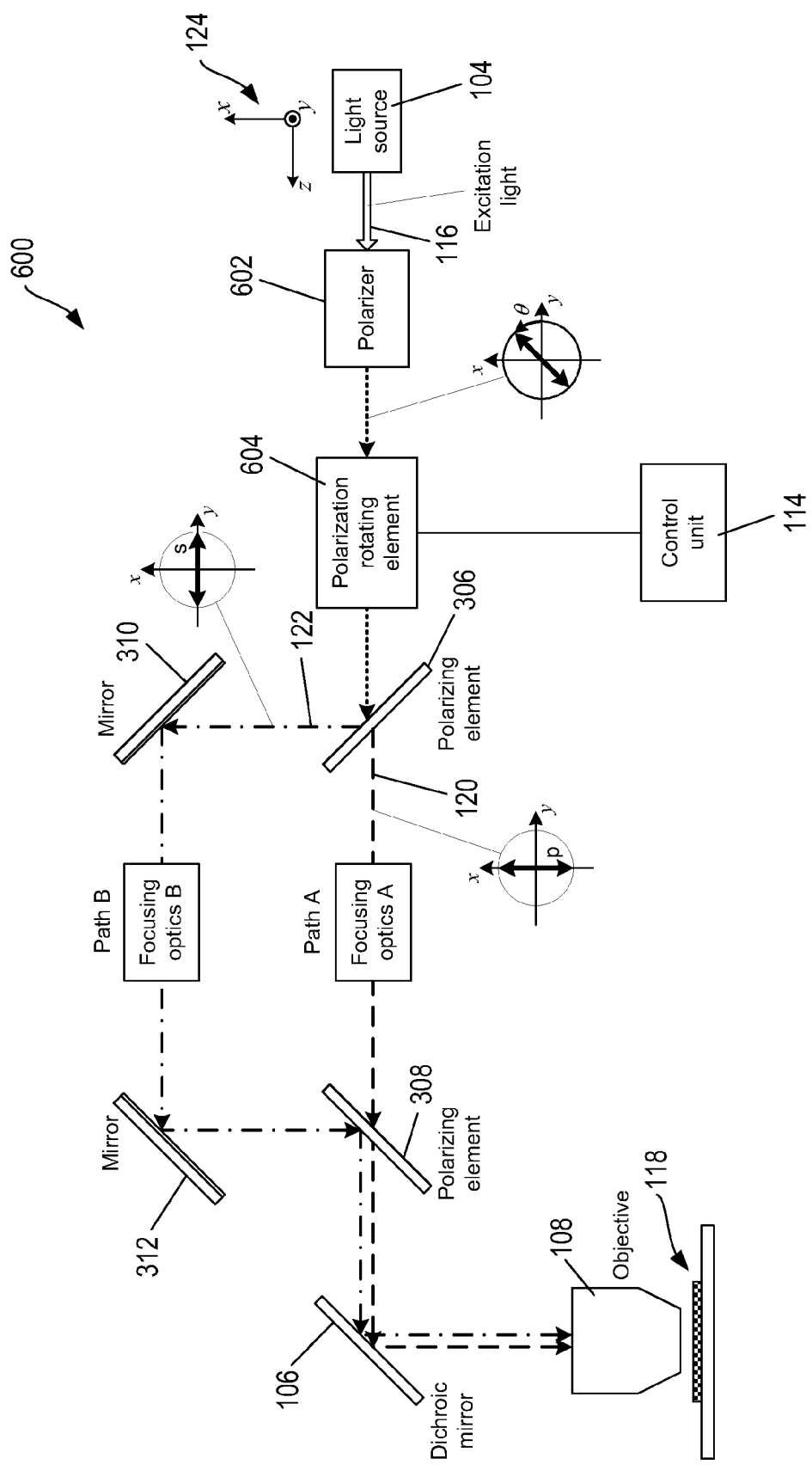
FIG. 6 shows a schematic representation of an example superimposing beam control to generate and control the optical properties of two polarized beams.

FIG. 6 shows a schematic representation of an example superimposing beam control 600 that can be used to generate and control the optical properties of the two differently polarized beams 120 and 122. The beam control 600 is similar to the beam control 300, except the light source 104 of the beam control 600 emits excitation light with an undefined, non-linear, or mixed polarization and the beam control 300 includes a polarizer 602. The polarizer 602 is an optical element that passes excitation light with a particular polarization and reflects or absorbs light with other polarizations. The polarizer 602 is used when the light source 104 emits unpolarized or non-linearly polarized light. The polarizer 602 can be a linear, absorptive polarizing filter, such as a polarizing filter composed of elongated silver nanoparticles embedded in a thin transparent plate or a polarizing filter composed of a polyvinyl plastic with iodine doping disposed on a thin transparent plate. In the example of FIG. 6, the polarization rotating element 604 is connected to the control unit 114 and can be operated to set the polarization of the excitation beam that reaches the first polarizing element 306.

Note that although the polarizer 602 is shown in FIG. 6 as a separate component from the light source 104, in practice, the polarizer 602 can be implemented as a component of the light source 104 in order to output the excitation light with a particular polarization.

Figure 7A:
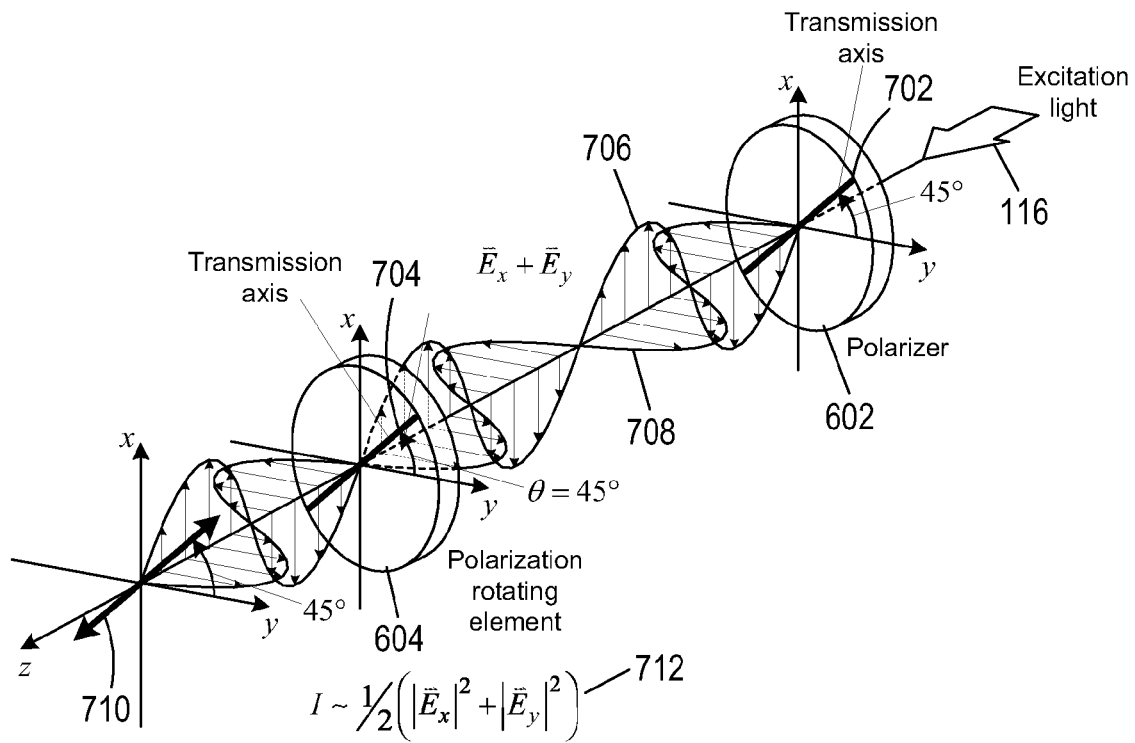
FIGS. 7A-7D show an example implementation of a polarization rotating element the beam control shown in FIG. 6 to generate and control two orthogonally polarized beams.
Figure 7B:
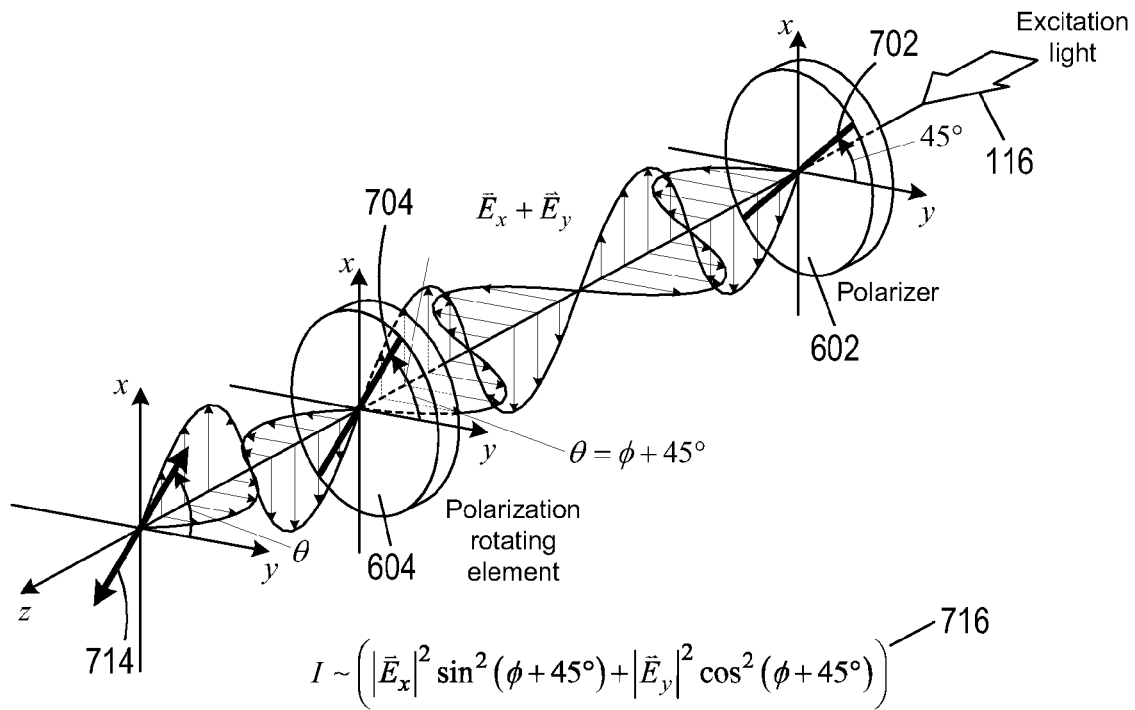
Figure 7C:
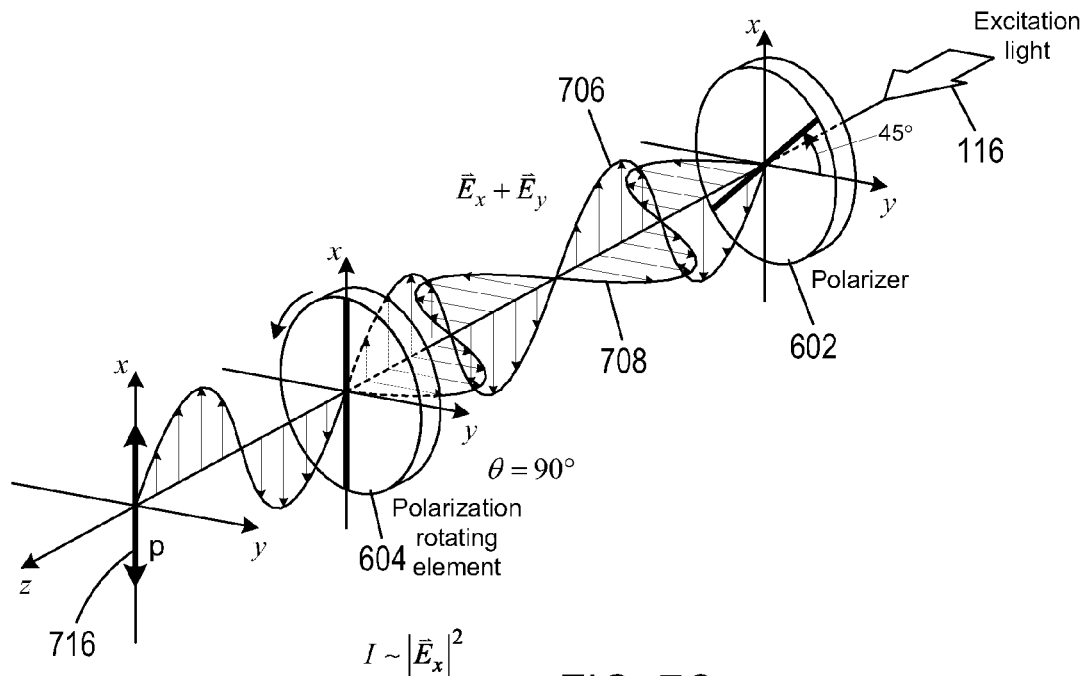
Figure 7D:
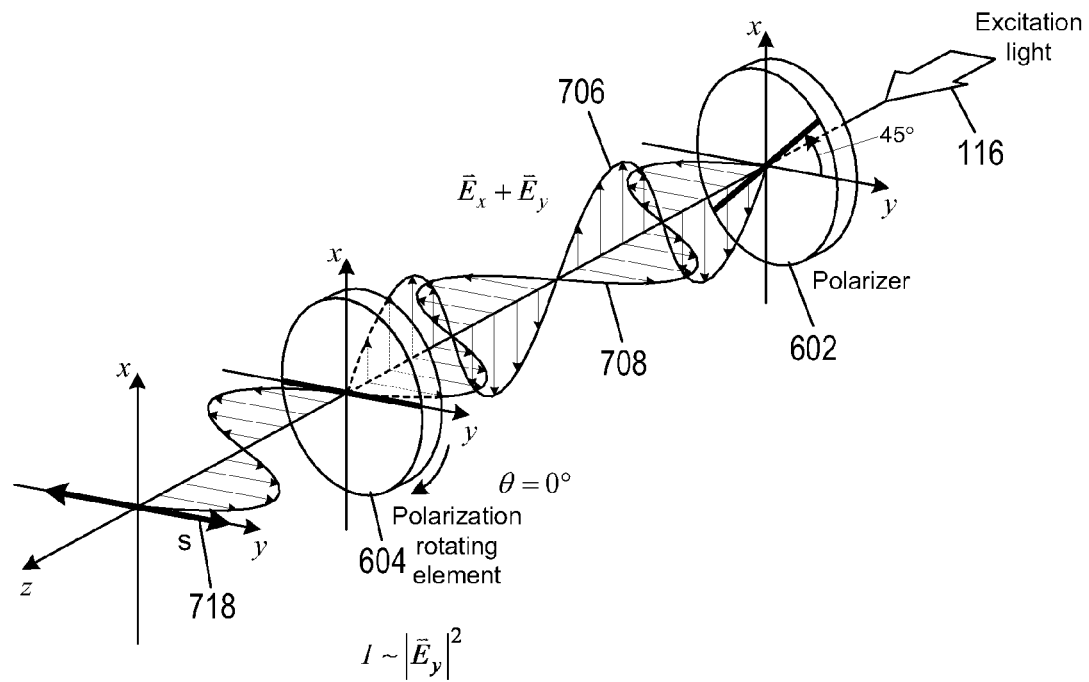

FIGS. 7A-7D show an example implementation of the polarization rotating element 604 of the beam control 600 to generate and control the orthogonally polarized beams 120 and 122. In FIGS. 7A-7D, Cartesian coordinates correspond to the Cartesian coordinates 124 used in FIGS. 1-4. The polarizer 602 and polarization rotating element 604 are represented by disks that intersect the z- or propagation axis. The polarization rotating element 604 can be a half-wave plate, a polarizer or Fresnel rhomb connected to a motor (not shown) rotates the polarization rotating element 604 about the z-axis within the xy-plane. Note that although the polarization rotating element 604 can be implemented with a half-wave plate as described above with reference to FIGS. 5A-5D, in the example of FIGS. 7A-7D, the polarization rotating element is implemented as a polarizer. Dark lines 702 and 704 represent the orientations of the transmission axes of the polarizer 602 and the polarization rotating element 604, respectively. The transmission axis 702 of the polarizer 602 is fixed at 45° with respect to the x- and y-axes. As a result, the excitation light output from the polarizer 302 has a 45° polarization angle that can be decomposed into two orthogonal polarization basis states, which can be an xz-plane polarization, $\vec{E}_x$, 706 (i.e., p-polarization) and a yz-plane polarization, $\vec{E}_y$, 708 (i.e., s-polarization). The polarization of the light output from the polarization rotating element 604 is determined by the angle of the transmission axis 704. In the example of FIG. 7A, the transmission axis 704 of the rotating element 604 is aligned with the transmission axis 702 of the polarizer 602 (i.e., θ=45°). As a result, the polarization of the excitation light is unchanged by the polarization rotating element 704, as represented by double-headed directional arrow 710, and the intensity 712 of the excitation light is composed of approximately equal parts of s- and p-polarized light. In the example of FIG. 7B, the transmission axis 704 of the polarization rotating element 604 is rotated away from 45° by through the angle φ (i.e., θ=φ+45°). As a result, the excitation light is output with a θ angle of polarization, as represented by double-headed directional arrow 714 with the amplitude $|\vec{E}_y|^2$ of the $\vec{E}_y$ polarization component 708 less than the amplitude $|\vec{E}_x|^2$ of the $\vec{E}_x$ polarization component 706. In the example of FIG. 7C, the transmission axis 704 of the rotating element 604 is aligned with the x-axis (i.e., θ=90°). As a result, the excitation light output from the rotating element 604 is p polarized, as represented by double-headed directional arrow 716. In the example of FIG. 7D, the transmission axis 704 of the rotating element 604 is aligned with the y-axis (i.e., θ=0°). As a result, the excitation light output from the rotating element 604 is s-polarized, as represented by double-headed directional arrow 718.

Figure 8:
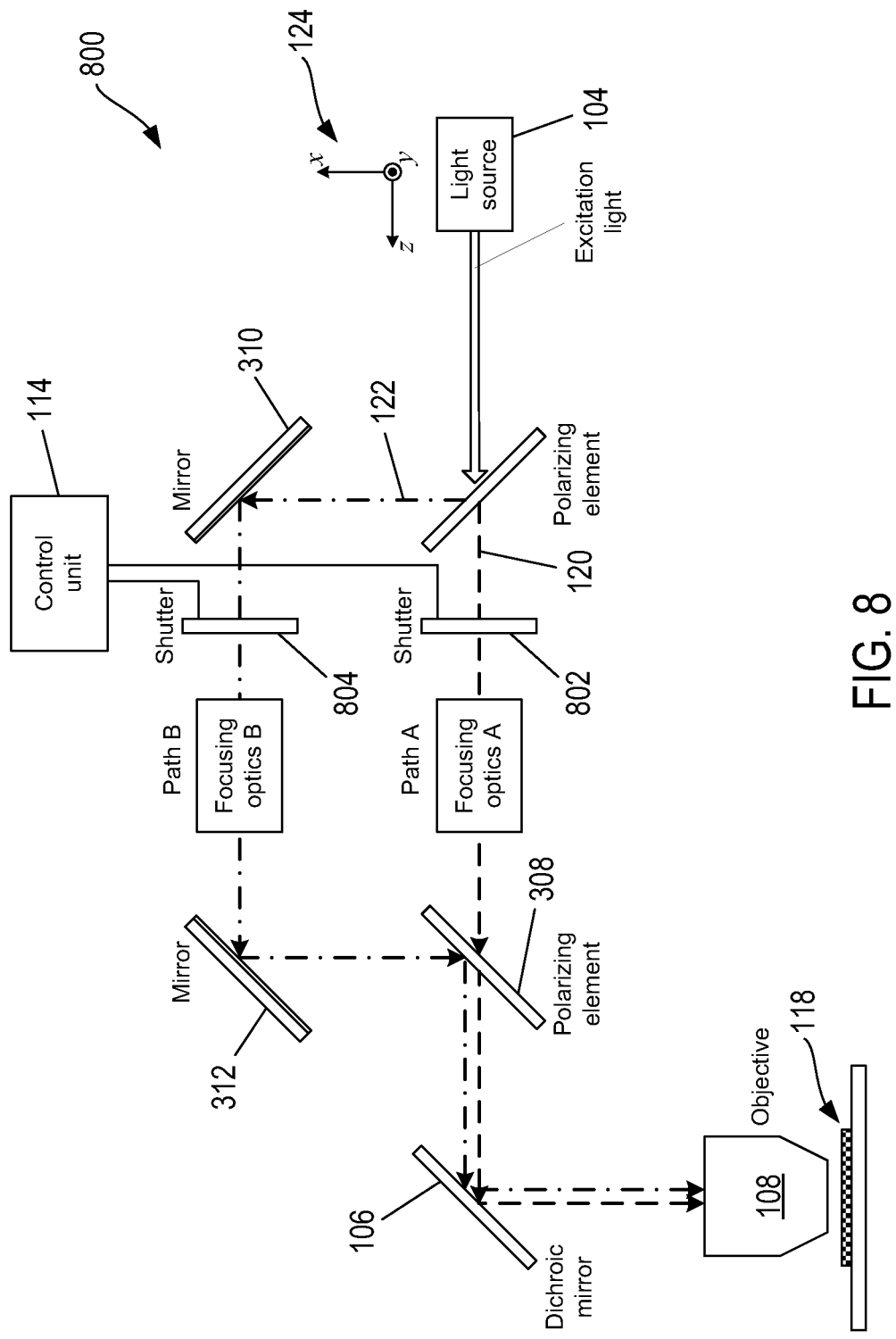
FIG. 8 shows a schematic representation of an example superimposing beam control to generate and control the optical properties of two polarized beams.

In alternative embodiments, the superimposing beam control 102 can be configured to simultaneously output the beams 120 and 122 with approximately the same intensity or output only one of the beams. FIG. 8 shows a schematic representation of an example superimposing beam control 800 that can be used to generate and control the optical properties of the two differently polarized beams 120 and 122. The beam control 800 is similar to the beam control 300, except the polarization rotating element 304 of the beam control 300 is omitted and the beam control 800 includes two electronically controlled shutters 802 and 804 located in the paths A and B, respectively, that are connected to the control unit 114. In the example of FIG. 8, the light source 104 outputs excitation light with a 45° polarization angle and the shutters 802 and 804 can be opened to allow both of the beams 120 and 122 to simultaneously enter the objective lens 108, or one of the shutters can be closed while the other is open to selectively allow only one of the beams to be input to the objective lens 108.

Figure 9:
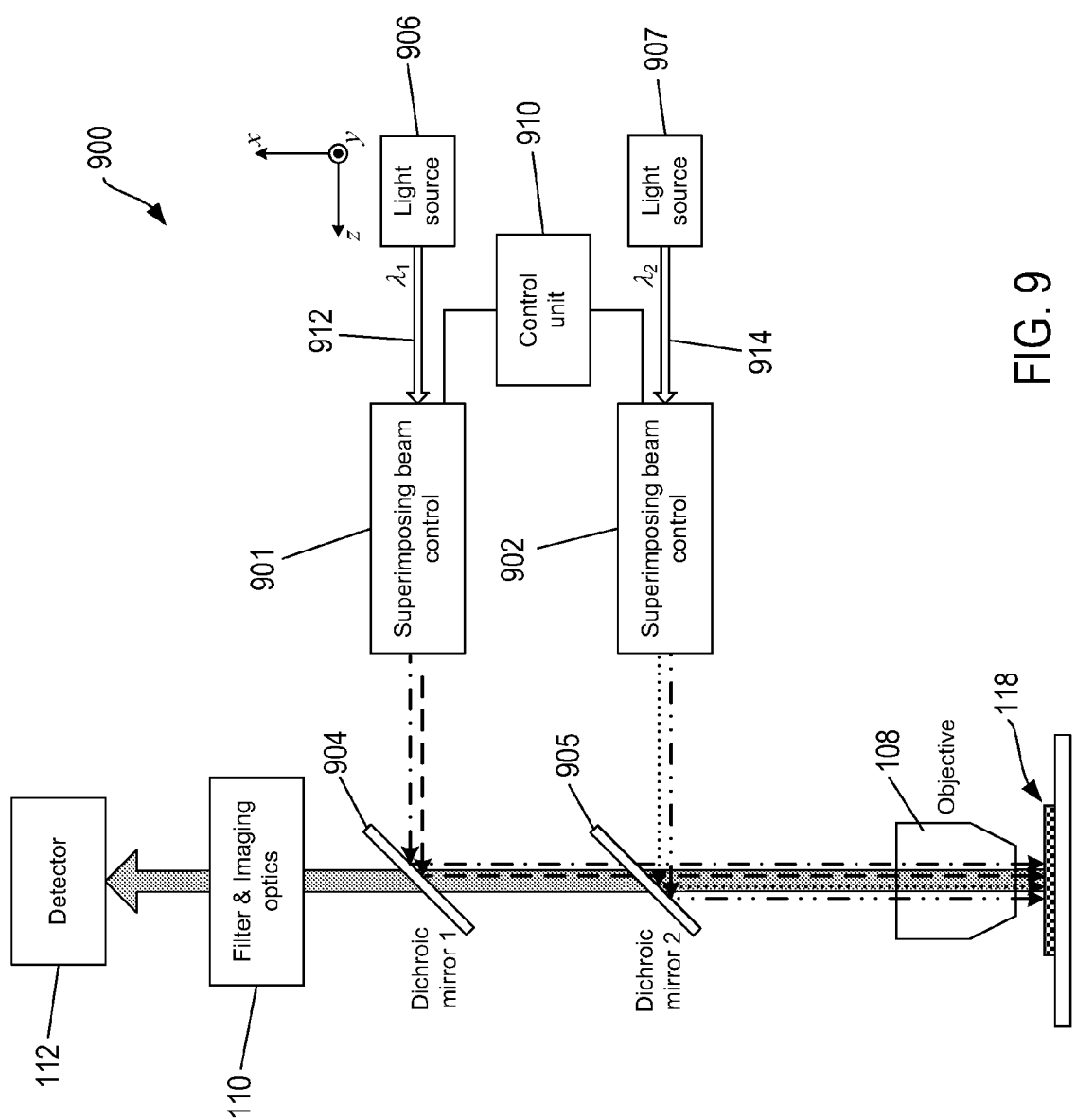
FIG. 9 shows an example of a fluorescence microscopy instrument that includes two superimposing beam controls.

In alternative embodiments, microscopy instruments can include more than one superimposing beam control. FIG. 9 shows an example of a fluorescence microscopy instrument 900 that includes two superimposing beam controls 901 and 902. The instrument 900 is similar to the instrument 100, except the instrument 900 includes first and second dichroic minors 904 and 905, two separate lights sources 906 and 907, and a control unit 910. The light sources 906 and 907 can be lasers that emit corresponding high-intensity, substantially monochromatic beams of excitation light 912 and 914 with wavelengths $\lambda_1$ and $\lambda_2$ to stimulate emission of fluorescent light from different fluorophores of fluorescent probes that are designed to bind to particular components of the specimen 118. The beams 912 and 914 are composed of excitation light with undefined or mixed polarization that are input to corresponding beam controls 901 and 902. The beam controls 901 and 902 are configured and operated as described above to select polarization states directed to the dichroic minors 904 and 905. The dichroic minor 904 reflects the excitation light with wavelength $\lambda_1$ and the dichroic mirror 905 reflects the excitation light with the wavelength $\lambda_2$ and passes light with the wavelength $\lambda_1$ to the objective lens 108. The beam controls 901 and 902 are configured to output the differently polarized beams to illuminate the specimen 118 according to different microscopy techniques. The control unit 910 can be used to select the intensity associate with each beam and/or selectively turn "off" one of the polarized beams, as described above with reference to FIGS. 3 and 5. A portion of the fluorescent light emitted from the fluorophores is captured and collimated by the objective lens 108. The dichroic minors 904 and 905 are configured to transmit the fluorescent light. The filter and imaging optics 110 block passage of the excitation wavelengths and focuses the fluorescent light onto the detector 112.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the following claims and their equivalents.

What is claimed is:

1. A fluorescent microscopy instrument to illuminate a specimen, the instrument comprising:
   an objective lens;
   a light source configured to output excitation light;
   a superimposing beam control comprising:
      a polarization rotating element configured to receive the excitation light from the light source and to output polarized light in a desired polarization state, the polarization rotating element consisting of a half-wave plate and a motor configured to rotate the half-wave plate;
      a first polarizing element configured to split the polarized light from the polarization rotating element into a first excitation beam with a first polarization state and a second excitation beam with a second polarization state;
      first focusing optics configured to focus the first excitation beam at a back focal plane of the objective lens;
      second focusing optics configured to focus the second excitation beam at a specimen plane of the objective lens; and
      a second polarizing element configured to superimpose the first excitation beam and the second excitation beam and to output the first excitation beam and the second excitation beam to the objective lens;
      wherein the first excitation beam is directed at or adjacent outer edges of the objective lens so as to provide an angle of incidence at the illuminated specimen which supports total internal reflection; and
      wherein the polarization states of the first excitation beam and the second excitation beam are such that the first excitation beam and the second excitation beam are maintained substantially without constructive or destructive interference at the objective lens; and
   a control unit in communication with the polarization rotating element to control the desired polarization state of the polarized light from the polarization rotating element, wherein the control unit directs the superimposing beam control to operate in a first mode in which the first excitation beam and the second excitation beam simultaneously illuminate the specimen, and wherein the control unit directs the superimposing beam control to operate in a second mode in which the first excitation beam and the second excitation beam illuminate the specimen at different times.

2. The instrument of claim 1, wherein the polarization rotating element is configured to change the polarization of the polarized light to control the relative intensity of the first excitation beam and the second excitation beam.

3. The instrument of claim 1, wherein the first polarizing element and the second polarizing element are polarizing beamsplitters.

4. The instrument of claim 1, wherein the first polarizing element is configured to split the polarized light so that the first polarization state is orthogonal to the second polarization state.

5. The instrument of claim 1, wherein the light source comprises a laser.

6. The instrument of claim 1, further comprising:
   a dichroic mirror configured to reflect the first excitation beam and the second excitation beam into the objective lens and to transmit fluorescent light emitted from fluorescently labeled components of the specimen and collimated by the objective lens; and
   a detector configured to receive the fluorescent light transmitted through the dichroic mirror.

7. The instrument of claim 6, wherein the detector is a CMOS camera, a CCD camera, or a photodetector.

8. The instrument of claim 4, wherein the first polarization state is a p-polarization state, and wherein the second polarization state is a s-polarization state.

9. The instrument of claim 1, wherein the superimposing beam control further comprises:

a first mirror configured to receive the second excitation beam from the first polarizing element and to reflect the second excitation beam to the second focusing optics; and a second mirror configured to receive the second excitation beam from the second focusing optics and to reflect the second excitation beam to the second polarizing element.

10. The instrument of claim 1, further comprising:
a second light source configured to output excitation light; and
a second superimposing beam control comprising:
  a second polarization rotating element configured to receive the excitation light from the second light source and to output polarized light in a desired polarization state;
  a third polarizing element configured to split the polarized light from the second polarization rotating element into a third excitation beam with a third polarization state and a fourth excitation beam with a fourth polarization state; and
  a fourth polarizing element configured to superimpose the third excitation beam and the fourth excitation beam and to output the third excitation beam and the fourth excitation beam to the objective lens.

11. The instrument of claim 10, wherein the control unit is in communication with the second polarization rotating element to control the desired polarization state of the polarized light from the second polarization rotating element.

12. The instrument of claim 10, wherein the excitation light from the light source has a first wavelength, wherein the excitation light from the second light source has a second wavelength, and wherein the first wavelength is different than the second wavelength.

13. The instrument of claim 10, further comprising:
a first dichroic mirror configured to reflect the first excitation beam and the second excitation beam into the objective lens and to transmit fluorescent light emitted from fluorescently labeled components of the specimen and collimated by the objective lens; and
a second dichroic mirror configured to reflect the third excitation beam and the fourth excitation beam into the objective lens, to transmit the first excitation beam and the second excitation beam, and to transmit fluorescent light emitted from fluorescently labeled components of the specimen and collimated by the objective lens.

14. The instrument of claim 13, further comprising a detector configured to receive the fluorescent light transmitted through the first dichroic mirror and the second dichroic mirror.

15. The instrument of claim 10, wherein the second polarization rotating element consists of a second half-wave plate and a second motor configured to rotate the second half-wave plate.

16. The instrument of claim 1, wherein the first polarizing element and the second polarizing element are Wollaston prisms.

17. The instrument of claim 1, wherein the first polarizing element and the second polarizing element are Normarski prisms.

18. The instrument of claim 6, further comprising filter and imaging optics positioned between the dichroic mirror and the detector, the filter and imaging optics configured to focus the fluorescent light transmitted through the dichroic mirror onto the detector.

19. The instrument of claim 1, wherein the light source is configured to output the excitation light with a forty-five degree polarization angle.

20. The instrument of claim 1, wherein the first focusing optics comprises a first combination of lenses and mirrors, wherein the second focusing optics comprises a second combination of lenses and mirrors, and wherein the first combination is different than the second combination.

* * * * *